Sept. 20, 1960  V. E. CARBONARA  2,953,060
POSITION FINDING DEVICE
Filed Feb. 15, 1957  2 Sheets-Sheet 1
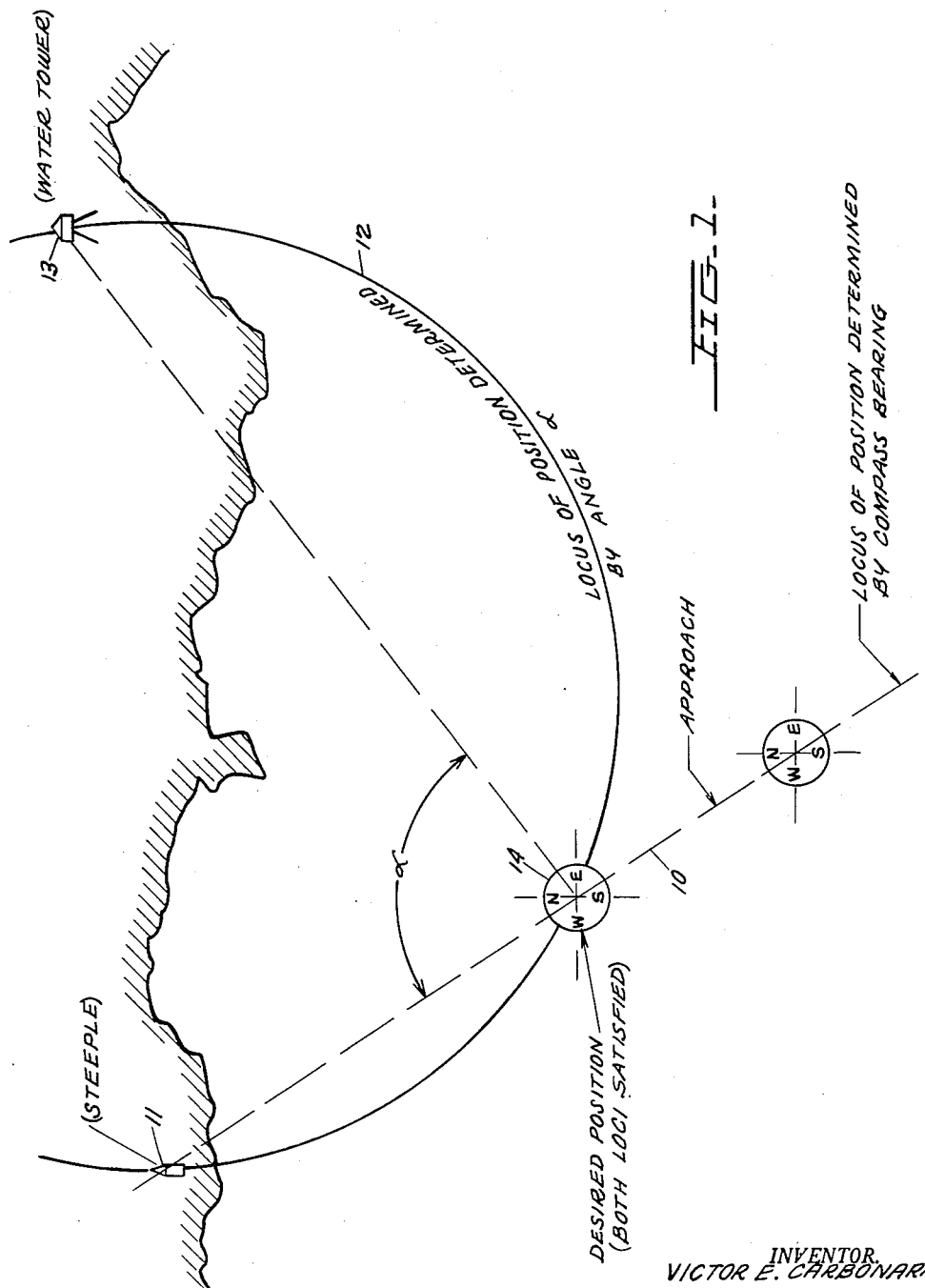
INVENTOR.
VICTOR E. CARBONARA
BY
ATTORNEYS Sept. 20, 1960 V. E. CARBONARA 2,953,060
POSITION FINDING DEVICE
Filed Feb. 15, 1957 2 Sheets-Sheet 2
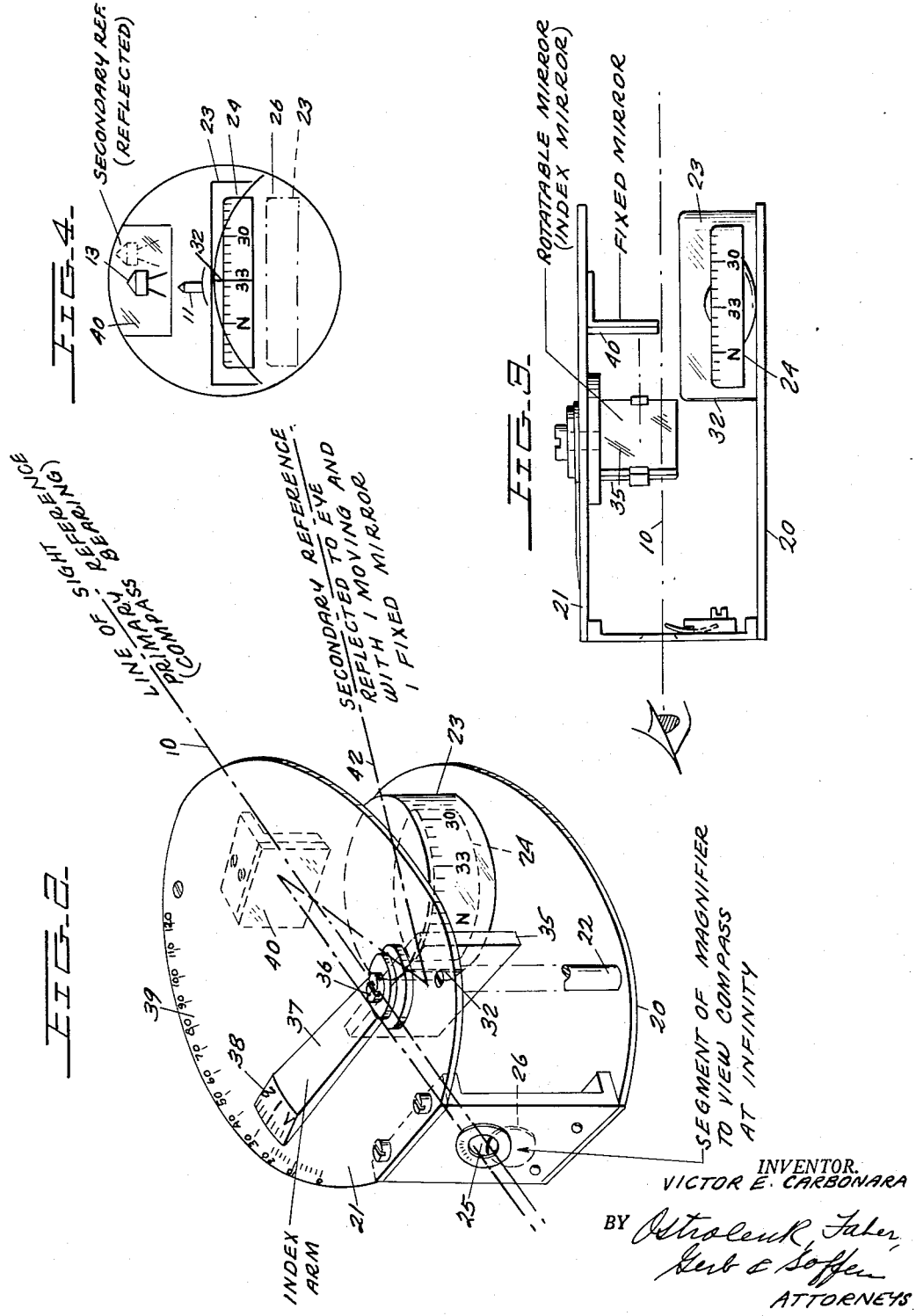
INVENTOR.
VICTOR E. CARBONARA
BY Ostrolenk, Faber,
Gerb & Soffen
ATTORNEYS

United States Patent Office 2,953,060
Patented Sept. 20, 1960

2,953,060
POSITION FINDING DEVICE

Victor E. Carbonara, Manhasset, N.Y., assignor to Ilon Industries, Inc., Long Island City, N.Y., a corporation of New York Filed Feb. 15, 1957, Ser. No. 640,531

2 Claims. (Cl. 88—2.4)

My present invention relates to a locating or position finding device and more particularly to a device for determing location from selected landmarks in such manner that the unskilled user may readily obtain a fix and use the data to return at any time, as long as the landmarks remain, to the identical location.

In the navigation of inland or coastal waters where landmarks are available, it is particularly desirable, especially in the case of operators of small craft including even row boats, to be able to return to a particular location or to traverse a particular irregular path as determined by particular locating points. It is also desirable that the performance of this operation need not require even general knowledge of navigation or the use of complex and expensive navigational instruments; this is particularly so in the case, for instance, of fishermen who fish primarily for sport at sporadic intervals and desire accurately to mark a good fishing point which may be several miles off shore or desire to mark the location of equipment lost at a time when it is inconvenient to delay to retrieve it. Also, the same problem applies to any geographic area such as extensive fields, plains or deserts where landmarks which may be differentiated from surrounding terrain are distant and sparse.

Heretofore, as far as the small boat operator was concerned, the expense of navigation instruments made specific location an unsolvable problem, the boat operator being satisfied to maintain a heading either bearing on a particular landmark or buoy or succession of landmarks or (in the case of the more skilled operator) based on a compass. This, however, merely determined a path along which the boat could be moved and did not determine location except to the extent that distance could be estimated from rowing time, sailing time or the relative apparent size of known shore based structures. Navigating instruments including sextants or directional radio receivers in the first instance cost as much or more than the entire boat and its equipment, then required skill in operation; also, except in unusual circumstances, such instruments provide good location within minutes of arc but could not be expected to provide pin-point location with an error of the order of a few feet, nor could they be utilized independently of tabulations and navigational calculations to indicate to the operator the path of the boat which will bring it to the desired location, the locating having been previously pin-pointed.

My invention is, therefore, directed to and has for its primary object a locating device which, because of the simplicity of its elements, may be pocket size, may be made to cost less than even an inexpensive watch and will nevertheless, without the exercise of any skill, provide almost instantaneously reference data to pin-point any location, which reference data may be used at any time to return to the pin-pointed location.

To carry out this object, my invention contemplates a unit having an eye piece, or at least an indication or sight for locating the eye with respect to the instrument, a compass rose viewable through the eye piece, a reference line aligned with the eye piece so that with the reference line placed on a landmark the eye may see the landmark, the reference line and the compass rose at the same time to determine the heading of the landmark. The instrument is also provided with a fixed mirror on a line of sight with the reference line and directed toward the eye piece and a rotatable mirror which may be moved to cause the image of a second landmark to be reflected from the rotatable mirror to the fixed mirror to the eye piece. The handle for turning the rotatable mirror will operate over a scale which may be read in terms of angular degrees from the reference axis (eye piece-reference line) or in any desired succession of numbers or indicia.

In use, the operator having decided that it is necessary to be able to return to a particular location on the water, will select two landmarks, such as a church steeple and a water tower. He will then place the eye piece of the instrument to his eye, place the reference line on the church steeple and see the compass heading of the steeple; he will then operate the handle of the rotating mirror until the water tower is brought into the line of sight. He will then note the compass heading of the steeple (say, 240) and the number of the scale (say, 55) on which the rotatable mirror handle stopped when the tower image entered the line of sight. The note may read: "steeple 240, tower 55."

At a subsequent time, to return to the same pin-point location, the operator will row to a place where the steeple compass bearing is 240. He will then operate the rotatable mirror to bring the tower into the line of sight. If the tower reading is more than 55°, he will row away from the steeple along a straight line keeping the steeple heading at 240 until the tower reading is 55°; if the tower reading is less than 55°, he will similarly row toward the steeple along a straight line keeping the steeple heading at 240 until the tower reading is 55°. In either case, having reached the line or path of correct heading with respect to the steeple and having determined whether he must row toward or away from the steeple, the operator may set the rotatable mirror handle at 55° and consult it occasionally until the tower, the steeple, the reference line and the compass heading (240, in this case) appear simultaneously in the line of sight. At this point, he will have returned to the previously pin-pointed location.

The foregoing and many other objects of my invention will become apparent in the following description and drawings in which:

Figure 1 is a diagrammatic view illustrating the navigational problem.

Figure 2 is a view in perspective partially in phantom of my novel position finding device.

Figure 3 is a side view of my novel position finding device.

Figure 4 shows the eye piece view when the pin-pointed location is reached.

Referring first to Figure 1, the navigational problem and method illustrated here has already been explained. The instrument will provide a locus of position 10 with respect to the church steeple 11 as determined by compass bearing and a locus of position 12 with respect to the water tower 13 determined by angle α. There is only one point 14 where both loci can be satisfied. The method of reaching this point, having previously determined locus 10 (compass bearing) for steeple 11 and angle α for tower 13 on a previous visit, is to move to a position on locus 10 and, maintaining the position on locus 10 (keeping the compass bearing on steeple 11 steady), move along line 10 until angle α with respect to tower 13 is reached.

Referring now to Figures 2 and 3, my novel position finding device which automatically permits point 14 to be located is shown in one form which it may take.

The instrument is provided with a base plate 20 and a parallel top plate 21 connected together by posts 22, 22. A magnetic compass is mounted on the base plate having a compass rose 24 arranged so that the indicia thereon may readily be viewed through the eye piece. The compass may be of any standard type; since, however, the instrument will most frequently be hand held and used in small craft, the best possible damping should be used, such as eddy current or magnetic damping. Compass 24 is contained in transparent housing 23 on which a reference line 32 is marked.

The eye piece 25 is supported in any suitable manner between the two plates 20 and 21. It need not be telescopic since the intended use of the instrument is from small craft low in the water where the limited horizon imposes a relatively short range. A telescopic eye piece may, however, be used where the expected range or expected relative smallness of landmarks may make it desirable. The primary function of the eye piece is to establish a line of sight or axis in combination with the reference mark 32 for the purpose of establishing bearing line locus 10 of Figure 1. The lower portion of the eye piece or tube 25 is fitted with a segment of a magnifying glass 26 so that the compass rose 24 may be viewed at infinity. Since the magnifying glass segment, as seen in the view of Figure 3 is in essence also prismatic, it also has the function of raising the image of compass rose 24 and reference mark 32 in the eye piece, bringing the image to just below the line of sight from the eye through to landmark 11. The compass 24 may thus be mounted on base plate 20 below the line of sight while nevertheless the image of the compass rose 24 will be brought up to the line of sight and can be viewed at infinity.

Since the reference mark 32 is on the housing 23 of compass 24, it also is viewed at infinity. Other reference means or sights may be mounted either on the top or bottom plate or between them; and if desired, a beam splitter with a sky illuminated slit may be provided so that the image of the slit will form the reference mark. Also, in special cases where the instrument is to be used at night with respect to illuminated objects (i.e. light houses, buoys), the instrument may be provided with a local source of illumination for illuminating at low intensity preferably only the reference mark and the compass rose 24.

The eye piece 25, the compass rose 24 and reference line 32 establish the axis or locus 10 for landmark 11. The angle α for landmark 13 is established by mirror 35 on pin 36 rotatably carried by plate 21. Handle 37 keyed to pin 36 may be manually operated to rotate pin 36 and mirror 35. Handle 37 is provided with pointer 38 reading on scale 39 on the top plate 21. A fixed mirror 40 is mounted at the end of the instrument opposite eye piece 25 and preferably just above the line of sight for axis 10. The plane of fixed mirror 40 is parallel to the axis of rotation of mirror 35. The combination of mirrors 35 and 40 and eye piece 25 operates to measure the angle in a horizontal plane. The image of object 13 received along line 42 is reflected from rotatable mirror 35 to fixed mirror 40 to the eye piece 25. Mirror 35 must be rotated until the image of object 13 is directed into eye piece 25. The setting of mirror 35 which achieves this result is marked by pointer 38 on handle 37 reading on scale 39. Scale 39 may read in degrees of arc measured from axis 10 but may read in any indicia which experience may find suited to a particular purpose or type of user.

In use, after deciding that he would like to return to a particular point on the water, the user will sight through eye piece 25 on a landmark 11 and rotate handle 37 until a landmark 13 also coincides with the reference line (see Figure 4). He then notes the compass bearing for landmark 11, removes the instrument from his eye and notes the pointer 38 setting for landmark 13. To return to the particular point, the user moves his craft to a line where a sight through the instrument on landmark 11 will provide the same compass bearing; he then operates handle 37 to bring landmark 13 to the reference line. If the setting of pointer 38 is higher than that noted, he moves away from landmark 11 along the line established by the compass bearing until he can bring both landmarks 11 and 13 to the reference line with the originally noted setting. If the setting of pointer 38 is smaller, then he moves toward landmark 11 until both landmarks 11 and 13 can be brought to the reference line with the originally noted setting.

While especially suited to locating points on water where landmarks are available, my novel instrument may, of course, be used in any relatively featureless terrain to locate a point by sighting on mountain peaks, outcroppings or other remote landscape features.

In the foregoing I have described my invention solely in connection with an illustrative embodiment thereof. Since many variations and modifications will now be obvious to those skilled in the art, I prefer to be bound, not by the specific disclosures herein contained, but only by the appended claims.

I claim:

1. A self-contained hand-held position locating device for effecting a simultaneous view of the lines of sight of two distant objects, comprising upper and lower generally parallel plates and a spacing bracket therebetween to which said plates are secured; a viewing aperture in said bracket for viewing objects at infinity focal length, a compass carried by said lower plate and a reference index therefor, said compass having a scale below the line of sight of said aperture, a portion of said aperture having lens means for viewing said reference index and said compass scale at infinity focal length, a fixed mirror carried by said upper plate above the line of sight of said aperture and a rotative mirror pivotally carried by said upper plate above said line of sight, an arm secured to said pivotal mirror to effect rotation thereof and having indicia to coact with indicia on said upper plate to indicate the angle between said lines of sight, whereby said compass scale and reference mark are thus viewable simultaneously with said lines of sight without eye focusing adjustment of an observer, to readily ascertain compass bearing for a line of sight on a first object directly viewed through said aperture and the angle to a line of sight of a second object brought into optical register with said first object by rotation of said rotative mirror.

2. In a device as set forth in claim 1, said compass scale being on a cylindrical surface wholly below the line of sight of said aperture, said lens serving as a prism to optically raise said compass scale to said aperture line of sight.

References Cited in the file of this patent

UNITED STATES PATENTS

| 7,477 | Locke | July 2, 1850 |
|---|---|---|
| 1,145,056 | Cole | July 6, 1915 |

FOREIGN PATENTS

| 9,082 | Great Britain | of 1909 |
|---|---|---|
| 11,750 | Great Britain | of 1910 |
| 364,867 | Great Britain | Jan. 14, 1932 |
| 433,866 | Great Britain | Aug. 19, 1935 |